United States Patent
Baeder

(10) Patent No.: US 10,091,677 B2
(45) Date of Patent: Oct. 2, 2018

(54) TECHNIQUE FOR TESTING LTE-ADVANCED CARRIER AGGREGATION RECEIVER CHARACTERISTICS

(71) Applicant: Rohde & Schwarz GmbH & Co. KG, Munich (DE)

(72) Inventor: Uwe Baeder, Ottobrunn (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 428 days.

(21) Appl. No.: 14/635,695

(22) Filed: Mar. 2, 2015

(65) Prior Publication Data

US 2015/0264591 A1    Sep. 17, 2015

Related U.S. Application Data

(60) Provisional application No. 61/950,886, filed on Mar. 11, 2014.

(51) Int. Cl.
*H04W 24/08* (2009.01)
*H04L 1/20* (2006.01)
*H04L 5/00* (2006.01)

(52) U.S. Cl.
CPC .......... *H04W 24/08* (2013.01); *H04L 1/205* (2013.01); *H04L 5/001* (2013.01); *H04L 5/0039* (2013.01); *H04L 5/0041* (2013.01)

(58) Field of Classification Search
CPC ...... H04W 24/08; H04W 24/06; H04L 5/001; H04L 1/205
See application file for complete search history.

(56) References Cited

U.S. PATENT DOCUMENTS

| 9,398,480 B2 * | 7/2016 | Siomina | H04W 24/10 |
| 2013/0039342 A1 * | 2/2013 | Kazmi | H04W 48/16 370/331 |
| 2013/0308481 A1 * | 11/2013 | Kazmi | H04W 24/02 370/252 |
| 2014/0029440 A1 * | 1/2014 | Genoud | H04L 5/001 370/241 |

(Continued)

FOREIGN PATENT DOCUMENTS

GB    2504293 A    1/2014

OTHER PUBLICATIONS

EPO, "International Search Report & Written Opinion", PCT/EP2015/054489, dated Jun. 8, 2015.

(Continued)

*Primary Examiner* — Redentor Pasia
(74) *Attorney, Agent, or Firm* — Potomac Technology Law, LLC

(57) ABSTRACT

An approach for testing LTE-Advanced CA receiver characteristics for 3DL CA and beyond, wherein the approach facilitates the limiting of test resources, such as test time, while at the same time optimizing test coverage is provided. A one non-measured downlink carrier, from a set of downlink (DL) carriers, is established as a primary component carrier. A first DL carrier and a second DL carrier, from the set of DL carriers, are established as secondary component carriers. Test measurements for the first DL carrier and the second DL carrier are simultaneously performed. The set of DL carriers forms one of a 3DL, 4DL and 5DL CA operating band set comprising at least three downlink carriers.

12 Claims, 9 Drawing Sheets

(56) References Cited

U.S. PATENT DOCUMENTS

| | | | |
|---|---|---|---|
| 2014/0098690 A1* | 4/2014 | Siomina | G01S 5/12 370/252 |
| 2014/0269361 A1* | 9/2014 | Asokan | H04W 24/06 370/252 |
| 2015/0016290 A1* | 1/2015 | Griesing | H04W 24/06 370/252 |
| 2015/0181583 A1* | 6/2015 | Siomina | H04W 16/14 370/330 |
| 2015/0257118 A1* | 9/2015 | Siomina | G01S 5/021 455/456.1 |

OTHER PUBLICATIONS

Hedlund, et al., "An Introduction to Carrier Aggregation Testing", Ascom Network Testing White Paper, NT12-13945, Feb. 15, 2014.
Johansson, "3GPP LTE Release 9 and 10 requirement analysis to physical layer UE testing", University of Helsinki, Department of Computer Science, Sep. 4, 2013.
Kottkamp, "Testing LTE-Advanced", Application Note, Rohde & Schwarz, Nov. 1, 2012.

* cited by examiner

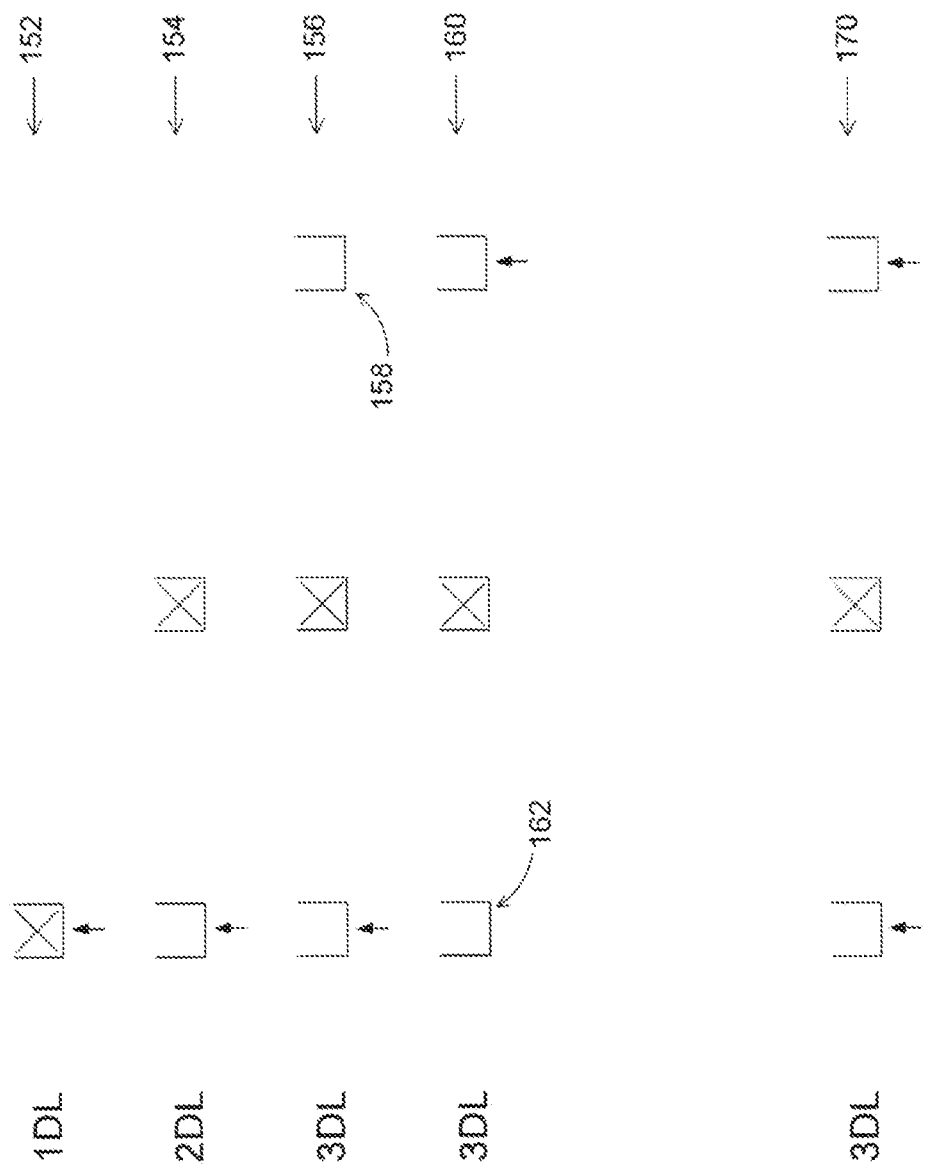

| 3DL Subset | Measured | DL Active | UL Active | |
|---|---|---|---|---|
| B4_B5_B30 | B4 | B4, B5, B30 | B5 | ← 702 |
| | B4 | B4, B5, B30 | B30 | ← 704 |
| | B5 | B4, B5, B30 | B4 | ← 706 |
| | B5 | B4, B5, B30 | B30 | ← 708 |
| | B30 | B4, B5, B30 | B4 | ← 710 |
| | B30 | B4, B5, B30 | B5 | ← 712 |

Fig. 7A

| 2DL Subset | Measured | DL Active | UL Active | |
|---|---|---|---|---|
| B4_B5 | B4 | B4, B5 | B5 | ← 732 |
| | B4 | B4, B30 | B4 | ← 734 |
| B4_B30 | B4 | B4, B30 | B30 | ← 736 |
| | B30 | B4, B30 | B4 | ← 738 |
| B5_B30 | B5 | B5, B30 | B30 | ← 740 |
| | B30 | B5, B30 | B5 | ← 742 |

Fig. 7B

TECHNIQUE FOR TESTING LTE-ADVANCED CARRIER AGGREGATION RECEIVER CHARACTERISTICS

RELATED APPLICATIONS

This application claims the benefit of the earlier filing date under 35 U.S.C. § 119(e) of U.S. Provisional Application Ser. No. 61/950,886 (filed Mar. 11, 2014), the entirety of which is incorporated herein by reference.

TECHNICAL FIELD

The Invention relates to the testing LTE-Advanced Carrier Aggregation receiver characteristics, for example, for performing conformance tests such as blocking tests, and further relates to software implementing corresponding test cases, and a correspondingly configured test system.

BACKGROUND

LTE-Advanced (LTE Release 10 & beyond) is a 4G (4th Generation) mobile communication system enhancing the basic LTE technology is specified in 3GPP Release 8. Carrier Aggregation (CA) is among the multiple features introduced with LTE-Advanced. In order to increase bandwidth and thereby bitrate, an LTE-Advanced capable UE (User Equipment) can be allocated 01 (Downlink) and UL (Uplink) aggregated resources comprising two or more carriers, wherein aggregated carriers are referred to as Component Carriers (CC).

Three different modes of CA are defined within LTE-Advanced:
  intra-band contiguous CA,
  intra-band non-contiguous CA, and
  inter-band CA.

Intra-band CA relates to carrier aggregation wherein the component carriers belong to the same operating frequency band. For contiguous CA, contiguous component carriers are allocated while for non-contiguous CA carriers are allocated with one or more gaps between them. In case of inter-band CA, the component carriers belong to different operating frequency bands.

A component carrier can have a bandwidth of 1.4, 3, 5, 10, 15 or 20 Megahertz (MHz) and it is envisaged that a maximum of five component carriers can be aggregated, resulting in a maximum aggregated bandwidth of 100 MHz instead of at most 20 MHz without CA. However, according to Release 11 the maximum number of carriers in DL is 2, i.e., 2DL CA and therefore maximum aggregated bandwidth is 40 MHz. As an example, 3GPP IS 36.101 version 11.6.0 Release 11 may be consulted for further details on required UE transmission and reception characteristics.

It is envisaged that more than two, i.e., three downlink carrier aggregation (3DL CA), four downlink carrier aggregation (4DL CA), or five downlink carrier aggregation (5DL CA) will be introduced in the next releases to come. Current implementations are also restricted to one UL carrier. i.e., no CA on UL, while 2UL CA systems can be contemplated for future releases.

UEs can be said to support a specific functionality in case they have tested accordingly to verify proper functioning. The standard 3GPP IS 36.508 version 11.2.0, for example, defines a common test environment for UE conformance testing in Rel. 11 and 3GPP TS 36.521-1 version 11.2.0 Release 11 defines UE conformance specifications for radio transmission and reception for conformance testing Including measurement procedures for the conformance tests. Test cases are defined for testing UE capabilities such as reference sensitivity level, maximum input level, adjacent channel selectivity, blocking characteristics, etc, wherein test cases are defined without taking the CA feature into account, i.e., a single carrier is established only, while other test cases measure the UE capabilities when CA is active, i.e., for 2DL CA in case of Rel. 11.

"Testing LIE Advanced-Application Note" (accessible at http://www.rohde-schwarz.com/en/solutions/wireless-communications/lte/applications/applications_57855.html, also to be found on the Rohde & Schwarz web pages by searching for 'Applications & White Papers for LIE/LTE-Advanced') describes aspects of test environments for testing LTE-Advanced technology components and discusses various testing aspects of such technology components.

A test case for 2DL CA may comprise picking one of the DL component carriers as the measured carrier and keep the other DL component carrier active; assign an uplink to the band not containing the measured carrier; and then perform the measurements. For example, for selectivity and blocking tests, interferers may be assigned relative to the measured carrier. The test is then to be repeated by swapping the roles of the measured and non-measured carriers/channels.

It can be contemplated that with increasing number of CCs (up to 5) in CA, the number of test cases to be performed multiplies for comprehensive testing, as the tests are to be repeated according to the number of component carriers available.

In order to limit test resources or test efforts in terms of associated test factors (e.g., number of test cases, test time, etc.), sets or suites of test cases may be limited to cover random samples or combinations of tested parameter combinations. Such an approach, however, results in incomplete test coverage and for a given fixed test effort the coverage will decrease rapidly from 2DL CA to 3DL CA and further beyond.

There is a need, therefore, for an approach for testing LIE-Advanced CA receiver characteristics for 3DL CA and beyond, wherein the approach facilitates the limiting of test resources, such as test time, while at the same time optimizing test coverage.

SUMMARY OF THE INVENTION

Embodiments of the present invention advantageously address the foregoing requirements and needs, as well as others, by providing an approach for testing LTE-Advanced CA receiver characteristics for 3DL CA and beyond, wherein the approach facilitates the limiting of test resources, such as test time, while at the same time optimizing test coverage.

In accordance with example embodiments, a method for testing LTE-Advanced Carrier Aggregation (CA) receiver characteristics comprises the following steps. A one non-measured downlink carrier, from a set of downlink (DL) carriers, is established as a primary component carrier. A first DL carrier and a second DL carrier, from the set of DL carriers, are established as secondary component carriers. Test measurements for the first DL carrier and the second DL carrier are simultaneously performed. Wherein the set of DL carriers forms one of a 3DL, 4DL and 5DL CA operating band set comprising at least three downlink carriers. According to one embodiment, the primary component carrier and the secondary component carriers are each established according to one of intra-band contiguous CA, intra-band non-contiguous CA, and inter-band CA. According to a further embodiment, the test measurements are implemented for at least one of conformance tests, in-band blocking tests, out-of-band blocking tests, adjacent channel sensitivity tests, narrow band blocking tests, spurious response tests and reference sensitivity level tests. According to a further embodiment, the simultaneous performance of the test measurements comprises simultaneously providing a first interfering signal for the first DL carrier and a second interfering signal for the second DL carrier. By way of example, the first and second interfering signals may be simultaneously provided according to a common frequency sweep pattern. According to a further embodiment, the simultaneous performance of the test measurements comprises providing one or more impairments to each of the first and second DL carriers, wherein the impairment(s) comprise one or more of delay, jitter, loss, corruption, duplication and re-ordering.

In accordance with further example embodiments, the method for testing LTE-Advanced Carrier Aggregation (CA) receiver characteristics further comprises performing a set of test cases for the first and second DL carriers, wherein the set of test cases excludes at least one specific combination of uplink configuration parameters from a predefined pattern of uplink configuration parameters for the primary component carrier. According to one embodiment, the set of test cases is performed for the first and second DL carriers, wherein the set of test cases excludes at least one specific combination of uplink configuration parameters from a predefined pattern of uplink configuration parameters for the primary component carrier. According to a further embodiment, the set of test cases is performed for the first and second DL carriers, wherein the set of test cases excludes at least one test case for at least one 2DL CA operating band set as being redundant in view of at least one test case for at least one 3DL, 4DL or 5DL CA operating band set. According to a further embodiment the set of test cases is performed for the first and second DL carriers, wherein the set of test cases excludes at least one test case for at least one 1DL operating band as being redundant in view of at least one test case for at least one 3DL, 4DL or 5DL CA operating band set.

In accordance with further example embodiments, a method for testing LTE-Advanced Carrier Aggregation (CA) receiver characteristics comprises the following steps, selecting Two or more downlink (DL) carriers, of a CA operating band set defining at least three DL carriers, are selected. At least one non-measured DL carrier from the CA operating band set is established. An uplink (UL) carrier associated with the non-measured DL carrier Is established. Test measurements for the selected two or more DL carriers are simultaneously performed.

In accordance with further example embodiments, a computer-readable storage medium, stores executable instructions for performing testing of LTE-Advanced Carrier Aggregation (CA) receiver characteristics, wherein the executable instructions are configured, upon execution by one or more processors, to cause an apparatus to perform the method of: establishing, from a set of downlink (DL) carriers, a one non-measured DL carrier as a primary component carrier; establishing, from the set of DL carriers, a first DL carrier and a second DL carrier as secondary component carriers; and simultaneously performing test measurements for the first DL carrier and the second DL carrier; and wherein the set of DL carriers forms one of a 3DL, 4DL and 5DL CA operating band set comprising at least three downlink carriers. The instructions may be executed on a computing device of a test system or test environment such as a generic computer adapted for testing purposes or a dedicated computing hardware such as a dedicated test & measurement device. The instructions may specify one or more test cases in a generic programming language, in a language specifically provided for test devices, as a macro or batch file, etc. The computer-readable medium may comprise a permanent or re-writeable memory within or associated with a computing device or a removable CD-ROM, DVD or USB-stick, for example. Additionally or alternatively, the computer-executable instructions may be provided for download to a computing device, for example via a data network such as the Internet or a communication line such as a telephone line or wireless link.

In accordance with further example embodiments, a test system for testing LTE-Advanced Carrier Aggregation CA receiver characteristics, comprises a primary component control processor configured to establish, from a set of downlink (DL) carriers, a one non-measured DL carrier as a primary component carrier. The test system also comprises a secondary component control processor configured to establish, from the set of DL carriers, a first DL carrier and a second DL carrier as secondary component carriers. The test system further comprises a measurement processor configured to simultaneously perform test measurements for the first DL carrier and the second DL carrier. The set of DL carriers forms one of a 3DL, 4DL and 5DL CA operating band set comprising at least three downlink carriers. According to one embodiment, each of the primary and secondary component control processors is configured to establish, respectively, the primary component carrier and secondary component carriers according to one of intra-band contiguous CA, intra-band non-contiguous CA, and inter-band CA.

In accordance with further example embodiments, the test system for testing LTE-Advanced Carrier Aggregation CA receiver characteristics, further comprises a first signal generator and a second signal generator, wherein the first and second signal generators are configured to simultaneously provide, respectively, a first interfering signal for the first DL carrier and a second interfering signal for the second DL carrier. According to one embodiment, the first signal generator and the second signal generator is each configured to respectively provide the first interfering signal and the second interfering signal according to a common frequency sweep pattern.

In accordance with further example embodiments, the test system for testing LTE-Advanced Carrier Aggregation CA receiver characteristics, further comprises a signal impairment generator configured to provide one or more impairments to each of the first and second DL carriers, wherein the impairments comprising one or more of delay, jitter, loss, corruption, duplication and re-ordering.

According to various embodiments, the measurements may comprise providing simultaneously a first interfering signal for the first measured carrier and a second interfering signal for the second measured carrier. For particular test cases, for example, for intra-band contiguous CA (e.g., neighboring carriers), the first and second interfering signals may be one and the same signal, which can result in further test optimization. For other test cases, the first and second interfering signals may have common properties but may differ in at least one property. According to specific embodiments, the first and second interfering signals may have an offset in frequency, while having the same bandwidth.

A test case for a particular CA configuration may be repeated for various interfering signals differing, e.g., in offset, bandwidth, etc., which may correspond to performing different tests such as in-band and out-of-band blocking test for said particular CA configuration. Additionally or alternatively, for a given set of test cases the Interfering signal may sweep over the frequencies (channels, carriers) of a particular operating band, and/or may sweep over multiple operating frequency bands available for CA. The repetitions and/or sweeps may be performed according to a specific pattern. It is proposed that one and the same such frequency sweep pattern can be followed when providing both the first interfering signal for the first measured carrier and simultaneously the second interfering signal for the second measured carrier. Such approach may minimize efforts for preparing and performing suites of test cases for CA wherein carriers are measured simultaneously.

CA testing may also comprise testing UE capabilities with regard to internal data handling of data received via multiple carriers, which topic may concern a data handling on one or more of a network/IP layer, transport layer, application layer, for example. For testing, impairments such as delay, jitter, loss, corruption, duplication, re-ordering may be provided to one or more of packets, frames, blocks, and/or any other data structure or entity. According to various embodiments, the measurements may comprise providing one or more of such impairments to the first measured carrier and further providing one or more of such impairments to the second measured carrier. A pattern defining a time sequence of specific impairments may be defined same for the measured carriers, or may differ in statistical properties, and/or one and the same pattern may be applied with different time offsets, etc.

According to various embodiments, a set of test cases may be performed for given first and second measured carriers, wherein the set comprises variations in uplink configuration parameters, i.e., various test cases cover uplink configurations in the primary cell (an UL configuration associated to the primary component carrier). Uplink configuration parameters may include properties such as uplink frequencies, uplink resource blocks, uplink power.

A pattern of combinations of varying uplink configuration parameters can be predefined. According to various embodiments, one test case covers measuring two or more carriers. As the number of test cases shrinks compared to measuring each carrier in a separate test case, so does the number of test cases available for testing the uplink. According to some embodiments, a set of test cases may not entirely cover the pattern of uplink configuration parameters, i.e., may exclude one or more parameter combinations. For example, while a coverage may be complete for a full test set including various test cases without CA and with CA CC combinations such as 2DL and 3DL, when considering only a subset of said full test set the uplink coverage may be selected to be not complete. For example, mandatory test cases can be defined to be performed for each CA CC configuration, e.g., including testing parameter combinations based on worst case assumptions, while other test cases can be defined as optional.

A particular test case for a 3DL CA operating band set may be evaluated as including one or more 2DL CA test cases.

According to various embodiments, these 2DL CA test cases may then be skipped from a test execution, e.g., may be omitted from a mandatory test execution, as their corresponding measurements are performed in the 3DL CA test case, i.e., the 2DL CA test case may be seen as redundant. Similarly, one or more 1DL test cases may be excluded from execution. For a 4DL CA operating band set, 3DL CA, 2DL CA, and 1DL CA test cases may be skipped. For a 5DL CA operating band set, 4DL CA, 3DL CA, 2DL CA, and 1DL CA test cases may be skipped.

Preparing sets of test cases for providing a comprehensive testing (test coverage) of a feature such as carrier allocation is a complex task which generally comprises preparing test cases for covering a large number of parameters each with its specific variations and ranges. Further, the conformance of the tested device under various conditions such as different types of interfering signals, etc. has to be tested, which conditions by themselves imply further extensive requirements for comprehensive covering.

In view of said complexity, a general approach of preparing test suites may comprise identifying a specific parameter combination and defining said as the subject of a test case (by that action defining the test case), and repeating said action for as many specific parameter combinations as desirable or affordable. Therefore a conventional approach of a test case for 3DL CA may comprise, on the basis of test methodologies known for 2DL CA, selecting one of three carriers as the measured carrier and keeping the other two carriers active; assigning an uplink to one of the carriers or bands being different from or not containing the measured carrier, and then performing the measurements for the measured carrier. For example, for selectivity and blocking tests, interferers would be assigned relative to the measured carrier. The test would then to be repeated by swapping the roles of the measured carrier and the unmeasured carrier without associated uplinks, and the set of these two test cases would have to be repeated two times for permutation of the role of the carrier having the uplink assigned thereto.

In contrast, various embodiments propose to measure multiple component carriers simultaneously when testing LTE-Advanced CA receiver characteristics for 3DL CA and beyond. Simultaneous measurements may be performed for example by joining those tests which comprise measuring one DL carrier, establishing another DL carrier which has an uplink associated therewith, and establishing one (3DL) or more (4DL, 5DL) further DL carriers which are merely kept idle after establishment.

Performing tests and measurements strictly on a carrier-by-carrier basis requires swapping or interchanging measured and idle carriers. Combining those tests into fewer tests with simultaneous DL carrier measurements avoids establishing a DL carrier merely for keeping it idle, although the same carrier is the measured carrier in another test case, and therefore enables saving test time.

Required test efforts increase with increasing numbers of CCs for CA from 2DL to 3DL and beyond. For example, as a required test time correlates with the number of aggregated component carriers, more test time can be saved when applying one or more of the approaches described herein. According to various embodiments, the relationship between the increasing number of CA CCs and the number of test cases is relaxed leading to test efforts scaling more advantageously with increasing carrier numbers.

A reduced number of test cases to be performed as compared to measuring on a carrier-by-carrier basis leads to a corresponding reduction in test overhead and test complexity regarding various issues such as management of test cases, test initiation, setup of initial conditions per test case, etc.

Although the number of test cases can be reduced, a degree of coverage can be kept high. For example, according to various embodiments full coverage of given CA configurations can be achieved.

When testing configurations with a given number of measured carriers, tests with corresponding configuration with lower number of carriers can be identified and may be skipped or declared optional. Such approach can further contribute to minimize the number of test cases while a desired degree of coverage can be kept high.

While focusing on receiver characteristics herein, it can be contemplated that the approaches discussed can likewise be applied for testing transmitter characteristics. For example, according to one aspect, a method of testing LIE-Advanced CA transmitter characteristics may comprise, for measuring at least a first measured carrier and a second measured carrier of a 3DL, 4DL or 5DL CA operating band set defining at least three uplink carriers, establishing one of the non-measured uplink carriers as primary component carrier and establishing the first and second measured carriers as secondary component carriers; and simultaneously performing test measurements for the first measured carrier and the second measured carrier.

BRIEF DESCRIPTION OF THE DRAWINGS

Various example embodiments of the present invention are described in greater detail by way of example with reference to Figures of the drawings, wherein the Figures show only example embodiments of the invention. Identical components in the Figures are marked with identical reference numbers. The drawings show:

FIG. 1B schematically illustrates 1DL, 2DL and 3DL CA configurations for testing methods. In accordance with example embodiments of the present invention;

FIG. 1C schematically illustrates a further 3DL CA configuration for testing methods, in accordance with example embodiments of the present invention;

FIG. 7A illustrates a sequence of test cases for a 3DL operating band subset, in accordance with example embodiments of the present invention;

FIG. 7B illustrates a sequence of test cases for various 2DL operating band subsets corresponding to the 3DL test cases of FIG. 7A, in accordance with example embodiments of the present invention.

DETAILED DESCRIPTION OF EMBODIMENTS

Figure 1A:
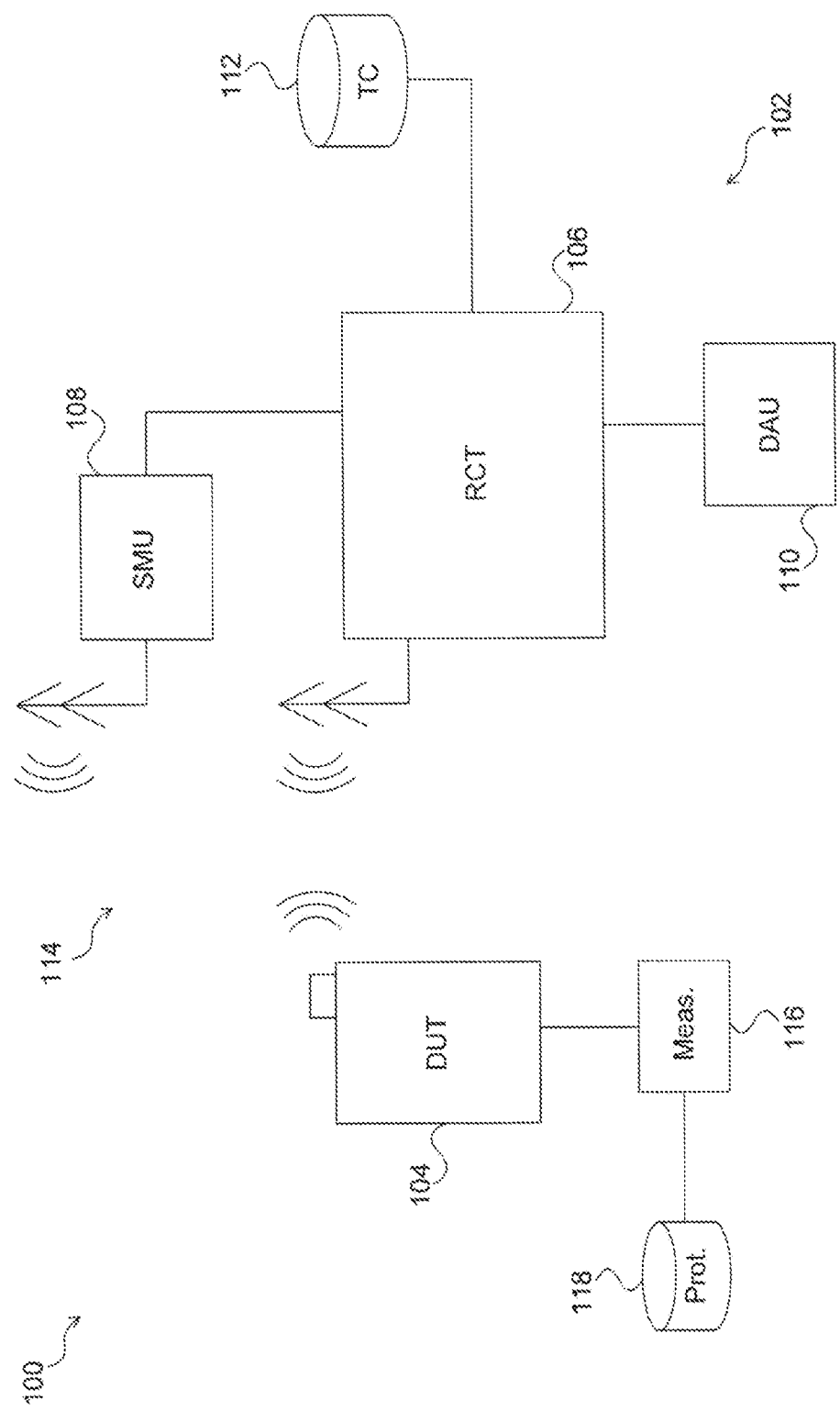
FIG. 1A illustrates a block diagram of a test environment for performing test methods, in accordance with example embodiments of the present invention.

FIG. 1A illustrates a block diagram of a test environment (test bed) 100 for performing test methods, including a test system 102 for test & measurement of a device under test (DUT) 104, in accordance with example embodiments of the present invention. The test system 102 comprises as a test & measurement device a Radio Communication Tester (RCT) 106 and a signal generator or source measurement unit (SMU) 108. Further, a Data Application Unit (DAU) 110 is controlled by the RCT 106, A repository 112 is provided for storing test cases (TC) to be executed.

The DUT 104 may be any device capable of communicating via a radio interface 114 such as a correspondingly enabled chip, chipset, network card, stick, etc. Other example implementations of the DUT 104 may comprise a consumer device such as any kind of a mobile device, smartphone, tablet or other general-purpose computer with integrated communicating facility, a field device for industrial purposes, etc. The radio interface 114 may be specified by an LTE-Advanced standard such as Release 11, 12 or later. The radio Interface 114 may be implemented via cable between test system 102 and DUT 104, as known to the skilled practitioner.

The DUT 104 and operation thereof may be measured by the RCT 106 as discussed in more detail below, and/or a measurement module 116 may be provided, which may be adapted for monitoring one or more of internal status of DUT 104, an ability of DUT 104 of receiving data, error rates of receptions, Internal data handling, etc. Measurement results may be stored in a storage unit 118, which may comprise storing test protocols on which post processing, analysis, etc. can be performed.

Test environment 100 may comprise further equipment such as shielding arrangements, etc. as known to the skilled practitioner. While RCT 106 and measurement module 116 are illustrated as separate devices in FIG. 1, according to other embodiments both may be implemented as a single test & measurement device.

For executing a test run which may generally comprise executing a plurality of test cases, corresponding batch files and/or macro files may be retrieved by RCT 106 from repository 112, its execution be controlled by RCT 106, and test protocols being provided as a result of test execution be provided in, for example, a storage unit such as storage 118.

FIG. 1B schematically illustrates 1DL, 2DL and 3DL CA configurations for performing CA tests, in accordance with example embodiments of the present invention. DL carriers or channels are illustrated as open-top squares, an uplink associated to a particular DL carrier as a cross filling a corresponding square. A measured carrier is indicated by an arrow. According to a test case 152, a single downlink (101) is associated with a single uplink, i.e., no CA.

Case 154 illustrates a 2DL CA configuration wherein one of two downlinks is associated with an uplink, and the other DL CC not being associated with the downlink is the measured carrier. Generally, test cases defined for CA may comprise that one of the aggregated carriers may have associated an uplink therewith, while another carrier is focused on as the measured carrier, i.e., blocking tests, sensitivity tests, etc, are performed with regard to the measured carrier while the carrier having the UL associated thereto may be designated as a non-measured carrier (which does not exclude testing UL configurations). For complete test coverage of the 2DL subset to which the test case 154 belongs, a further test is required wherein the measured/non-measured roles of the carriers are swapped.

Test case 156 illustrates a 3DL configuration wherein one of three DL CCs has the uplink associated thereto and one of two remaining carriers is the measured carrier. The third carrier 158 is not measured and after establishment merely has to be kept active (idle) during testing the measured carrier. Said 3DL configuration requires the further test case 160 wherein the role of the measured carrier and the non-measured, idle carrier are swapped In a test preparation phase, for example for a particular LTE-Advanced Release, the test cases 156 and 160 can be generated, e.g., automatically, by using the 2DL test cases such as illustrated by case 154 as a template or basis.

FIG. 1C schematically illustrates a further 3DL CA configuration for testing methods, in accordance with example embodiments of the present invention. According to various embodiments, it is proposed to deviate from such test case generation mechanism, and to provide for a test organization such that the test cases 156 and 160 are performed simultaneously (in parallel, at the same time), i.e., the two measured carriers 158 and 162 may be measured in parallel or simultaneously, as indicated in FIG. 1C by test case 170, which illustrates the combination of cases 156 and 160 in a way similar to what has been discussed for the test cases of FIG. 1B.

When combining the test cases 156 and 160 into one, it is a matter of perspective whether to talk of one test case 170 or two test cases 156,160. For example, with regard to test organization and test execution, one might prefer talking of one test case 170, as setting up the initial conditions in the test system 102 and DUT 104 need to be performed only once, while with regard to the test results, there are two data sets, namely for the first, and for the second measured carrier, i.e., one might refer to two cases 156, 160. For these and other reasons, there is no sharp distinction made herein between (one) 'test case' and (multiple) 'test cases'; for example, any test case may be considered as comprising multiple sub-test cases also with respect to various other parameters to be tested.

Figure 2:
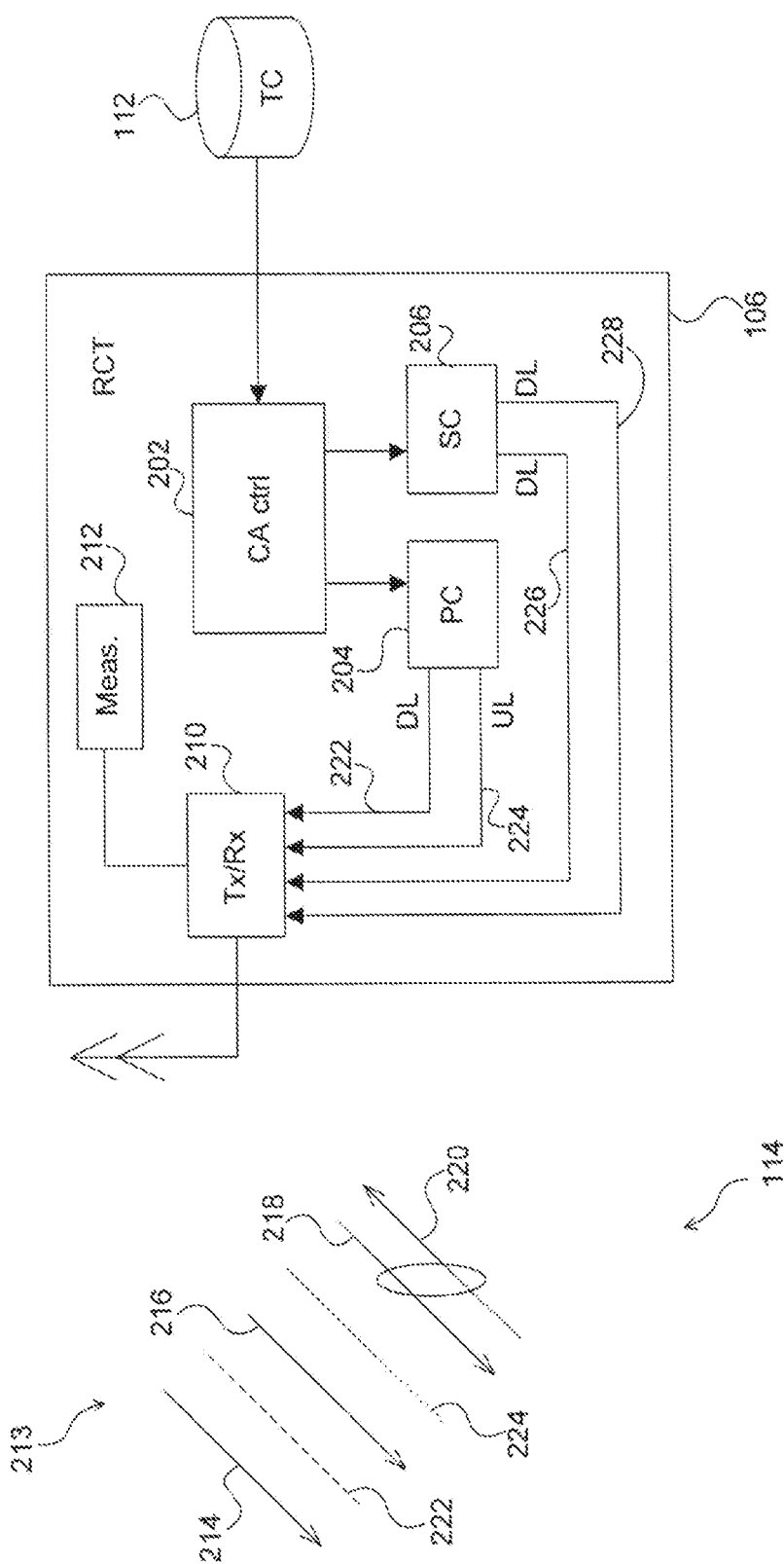
FIG. 2 illustrates a block diagram of functional modules of a test system, in accordance with example embodiments of the present invention.

FIG. 2 illustrates a block diagram of functional modules (e.g., the RCT 106 of FIG. 1) of a test system, in accordance with example embodiments of the present invention. A Carrier Aggregation control (CA ctrl) module 202 accepts information on one or more test cases to be performed from repository 112. The CA Ctrl module 202 controls accordingly a Primary Component (PC) control module 204 and a Secondary Component (SC) control module 206. The PC module 204 is adapted to initiate establishment of a primary CC or primary cell channel arrangement over radio interface 114 for OUT 104. The SC module 206 is adapted to initiate establishment of a secondary CC or secondary cell channel arrangement over radio interface 114 for DUT 104.

Radio communication between RCT 106 and OUT 104 is accomplished by transceiving (transmission and reception or Tx/Rx) equipment 210 which comprises antenna equipment for performing radio transmissions and receptions via radio interface 114. The RCT 105 including control equipment such as CA control 202 and transceiving equipment 210 may operate as an eNodeB emulator when performing test cases, wherein the skilled practitioner is familiar with details of such emulation.

For test measurement purposes, in addition or alternatively to the measurement device 116 (FIG. 1), a measurement module 212 may be provided which may be adapted, for example, for monitoring and analyzing data received from DUT 104 via UL 220 of radio interface 114.

Figure 3:
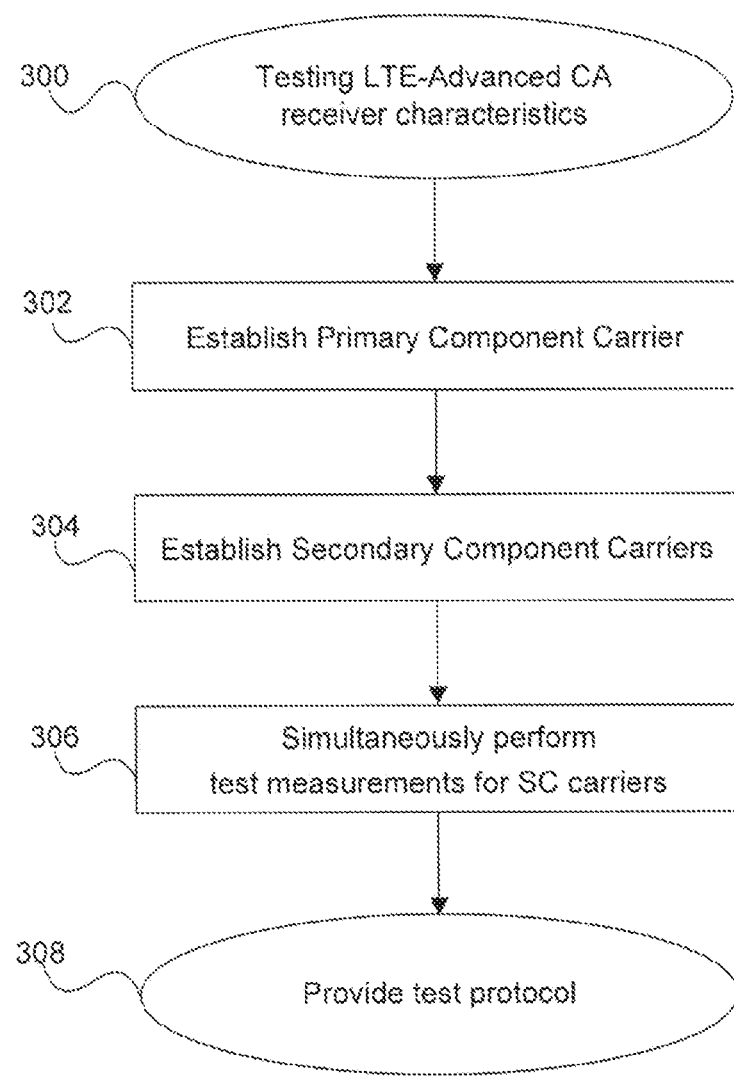
FIG. 3 is a flow diagram illustrating an operation of the test system of FIGS. 1 and 2, in accordance with example embodiments of the present invention.

FIG. 3 is a flow diagram illustrating an operation of the test system of FIGS. 1 and 2, in accordance with example embodiments of the present invention. An operation of the test system 102 of FIGS. 1A and 2 for the purpose of testing DUT 104 will be described with reference to the flow diagram in FIG. 3. Generally, the operation 300 relates to testing an LTE-Advanced CA receiver characteristics of DUT 104. Corresponding test cases may be retrieved by CA control module 202 from repository 112 and PC 204/SC 206 components be triggered accordingly for establishing a desired CA configuration. The example test case is assumed to comprise setup of a 3DL CA connection via radio interface 114 with DUT 104, and may further comprise sending data with predefined properties such as data rate, etc. to the DUT 104 via the DL carriers.

Further for reasons of example illustration, a test subject is assumed to relate to reception capabilities of DUT 104 with regard to a 3DL operating band set 213 illustrated schematically in FIG. 2 as comprising three 01 carriers 214, 216, 218 over radio interface 114 and one UL carrier 220. Specifically, the test subject may concern measuring reception capabilities of DUT 104 with regard to a reception via DL CC 214, i.e., carrier 214 is intended as a measured channel or carrier. At the same time, a further test subject concerns measuring reception capabilities of DUT 104 with regard to a reception via DL CC 216, i.e., 10 carrier 216 is also intended as a measured channel or carrier. In other words, two test cases are intended to be performed in parallel, namely a first test of testing DUT 114 with regard to CC 214, and a second test of testing DUT 114 with regard to CC 216, CC 218 is intended to be non-measured.

The test case to be performed may comprise testing one or more of intra-band CA and inter-band CA, and/or may comprise testing one or more of contiguous CA and non-contiguous CA. For example, channels/carriers 214 and 216, respectively, can be allocated in one and the same operating band, or can be allocated in different operating bands, the latter case being indicated by long-dashed line 222 in FIG. 1. Further purely for reasons of illustration it may be assumed that channels/carriers 216 and 218 are located in one band, which would include the options of both being allocated on neighboring frequencies, i.e., in a contiguous way, or can be allocated with a frequency gap in between, i.e., in a non-contiguous way, the latter case being indicated by short-dashed line 224.

In step 302, PC module 204 operates to provide DL control 226 for establishing the non-measured DL CC 218 as primary component carrier, which includes or Is accompanied by UL control 228 of establishing UL 220 in association to DL 218. The skilled practitioner is familiar with the corresponding LTE-Advanced CA procedures. Normally, both DL carrier 218 and UL carrier 220 will belong to one and the same operating band.

In step 304, SC module 204 operates to provide DL control 230 and DL control 232 for establishing the carriers 214 and 216, respectively, intended as measured carriers or secondary component carriers.

In step 306, the RCT 106 operates to control the carriers/channels 214-220 according to the details of the test case to be performed. For example, data may simultaneously be sent via transceiving equipment 210 and each of the DL CCs 214 and 216 to the DUT 204 with predefined data rates. In this respect, a control module such as the CA control 202 or SC control 206 needs to trigger test conditions as required with regard to simultaneously measuring both carriers 214 and 216. The measurement device 116 (FIG. 1) and/or module 212 of RCT 106 may then operate to simultaneously perform test measurements for each of the measured carrier 214 and the measured carrier 216.

As an example, module 212 may operate to check acknowledgement messages (or frames, blocks) or non-acknowledgement messages (frames, blocks) received via UL 220 from DUT, wherein said ACK or MACK messages indicate successful reception or not of data sent via the measured DL CCs. Specifically, the module 212 need to be adapted to check ACKs and NACKs for un/successful reception via DL 214, and for un/successful reception via DL 216.

In step 308, measurement device 116 and/or measurement module 212 in RCT 106 provide a test protocol to, e.g., storage 118. For example, a single test protocol regarding the simultaneous measurement of DUT 104 with regard to channels 214 and 216 may be written, and/or two separate protocols may be written for each of the measured CC 214, and the measured CC 216. A post-processing on the test protocol/s may be performed by other components of the test system 102, and/or may be performed remote of test bed 100.

The test environment generally introduced with respect to the previous figures may be employed, for example, for performing simultaneous tests on 3DL, 4DL or 5DL configurations. For example, tests & measurements may be performed for conformance tests such as sensitivity tests or blocking tests, wherein blocking tests may comprise in-band blocking tests, out-of-band blocking tests, narrow band blocking tests, spurious response tests, etc., and sensitivity tests may comprise adjacent channel sensitivity tests, reference sensitivity level tests, etc.

Figure 4A:
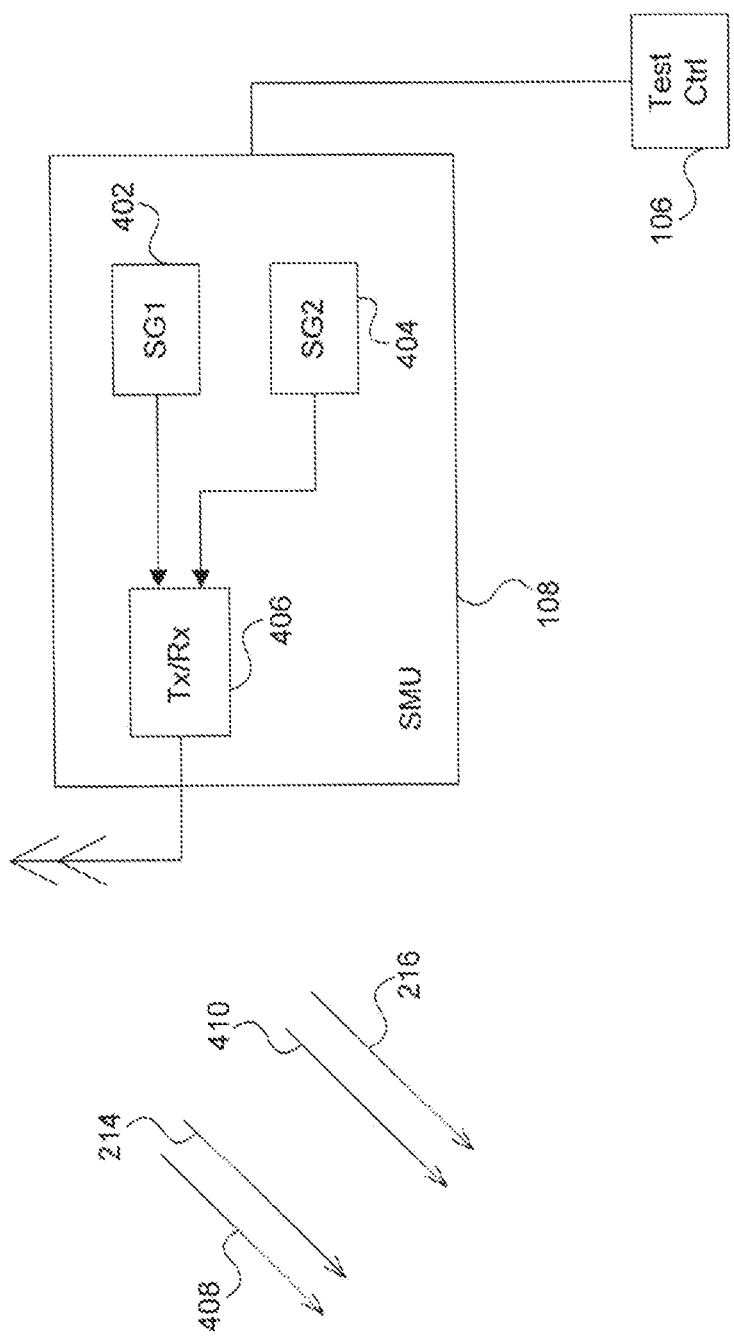
FIG. 4A illustrates a block diagram of further functional modules of a test system, in accordance with example embodiments of the present invention.

FIG. 4A illustrates a block diagram of further functional modules (e.g., the SMU 108 of FIG. 1) of a test system, in accordance with example embodiments of the present invention. FIG. 4A shows functional details of an example embodiment of, which comprises two signal generators (SG) 402 and 404 and transceiving (transmission and reception or Tx/Rx) equipment 406. The latter may comprise features and functionalities similar to what has been described above for transceiving equipment 210 of RCT 106. The generators 402 and 404 may be operated independent of each other, and each of generators 402 and 404 may generate signals such as may be provided by an eNodeB, wherein the signals may however be adapted for test purposes.

The generated signals may be provided to OUT 104 via radio interface 114 which may be implemented as discussed above. For example, when there Is a cable-based coupling between RCT 106 and OUT 104, the SMU 108 may also be coupled via cable and appropriate connector.

It is noted that while RCT 106 and SMU 108 are Illustrated as separate components in FIG. 1, according to other embodiments both functionalities may be provided as an integrated component using, e.g., one and the same transceiving equipment, such as equipment 210.

Figure 5A:
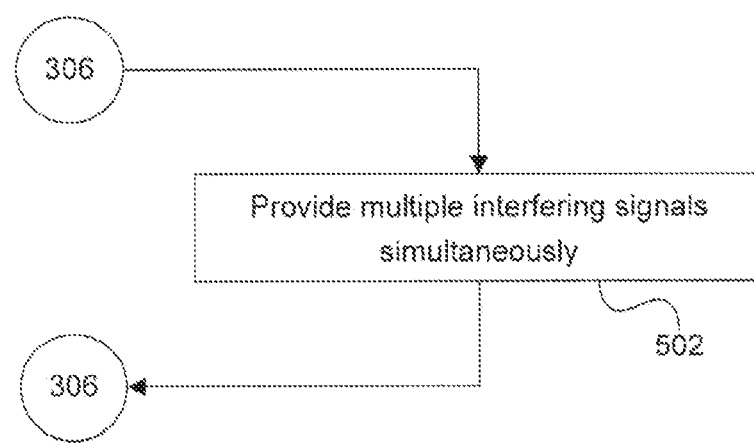
FIG. 5A is a flow diagram illustrating an operation of the test system of FIG. 4A, in accordance with example embodiments of the present invention.

FIG. 5A is a flow diagram illustrating an operation of the test system 102 (e.g., with specific regard to SMU 108 of FIG. 4A), in accordance with example embodiments of the present invention. In step 502, the SMU 108 is controlled to provide an interfering signal 408 with respect to measured carrier 214 in FIG. 2, and to simultaneously provide another interfering signal 410 with respect to measured carrier 216. For example, signal 408 may be provided from signal generator 402 and signal 410 may be provided from signal generator 404. Step 502 may be performed within the course of step 306 of FIG. 3, as illustrated in FIG. 5A, i.e., during the course of measurement of DL carriers 214 and 216.

Properties of signals 408/410 depend on the details of the test case(s) to be performed. For example, for out-of-band blocking tests, a bandwidth of interferer signal 408 may be near to or overlapping with the band or carrier (channel) 214, and a bandwidth of interferer signal 410 may be near to or overlapping with the band or carrier (channel) 216.

For truly simultaneous measurements in time of two carriers, two separate and Independent signal generators are required. SMU 108 may therefore be adapted to operate both generators 402 and 404 in parallel, i.e., each of the generators 404 and 406 may simultaneously generate signals and provide these to radio interface 114/DUT 104, for example if controlled accordingly by a test control equipment such as RCT 106 of FIG. 1.

According to other embodiments, the tests on the measured carriers may be performed quasi-parallel. This may concern that a single test case is performed with regard to a setup of test equipment 102 and/or DUT 104, wherein both measured carriers/channels 214 and 216 are established and kept in an active state, but the measurements are then performed sequentially, i.e., only one of the carriers is measured at a time. Such test execution saves test time for example as compared to performing separate test cases each including its own test setup phase with setting the test system and the DUT to defined initial conditions. In contrast to truly simultaneous measurements, less test equipment may be required, e.g., only a single signal generator may be required.

Assuming a truly simultaneous test execution in the example discussed with respect to FIGS. 4A and 5A, both interfering signals 408 and 410 are generated and provided at the same time, and also test execution in DUT 104 will be truly simultaneous, for example in that receiving and processing facilities for carriers 214 and 216, respectively, may work in parallel. Measurements to be performed for both measured carriers 214 and 216 in parallel may require quasi-parallel operation only, for example the measurement module 212 may listen to UL channel 220 and has to check for responses concerning both 01 channels 214 and 216 (and may ignore or discard responses for channel 218).

During a test case sequence, an interfering signal such as signal 408 or 410 may be applied according to a predefined pattern. For example, a frequency sweep pattern may be defined according to which the signal sweeps over frequencies of interest. This may concern, for example, performing different types of test for one and the same CA allocation configuration, wherein, e.g., sequentially a spurious response test, a narrow band blocking test, an in band blocking test, and an out-of-band blocking test are performed. When employing a pair of two parallel interferer signals such as the pair of signals 408 and 410 (i.e., when performing simultaneous measurements of parallel DL CCs), the interfering signals of the pair may both follow one and the same frequency sweep pattern, in order that, for example, for both measured carriers the same sequence of tests can be performed.

Additionally or alternatively, with regard to a sequence of tests of a specific test type, an interfering signal may also be applied according to a defined frequency sweep. For example, the interfering signal may sweep according to a predetermined pattern over the carriers or channels of a particular operating band, and/or over a sequence of operating bands. Also in this case the interfering signals of a pair of independently controlled interferers may follow one and the same frequency sweep pattern.

Figure 6:
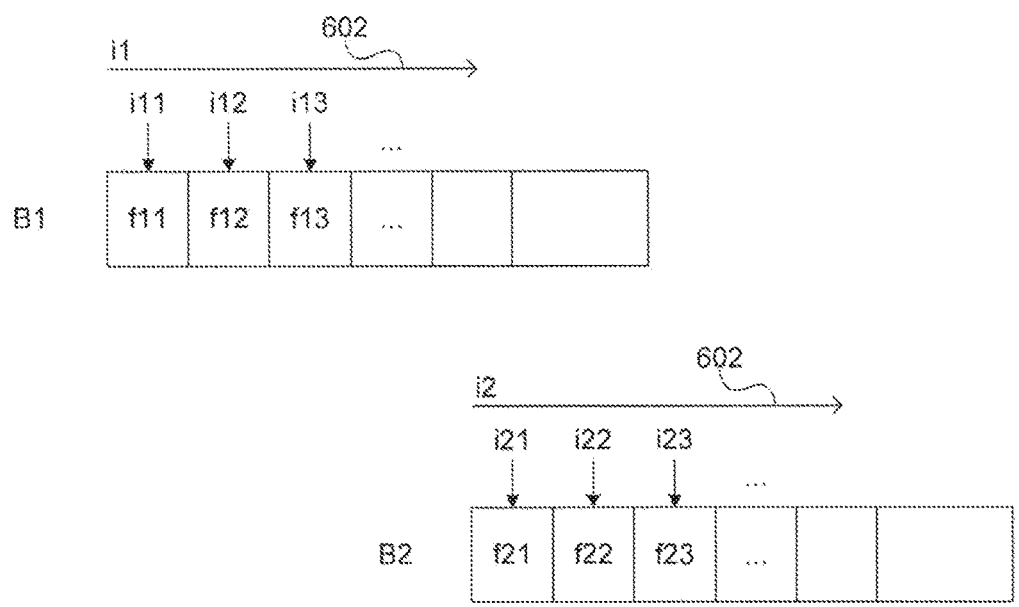
FIG. 6 illustrates a combined frequency sweep of two interfering signals, in accordance with example embodiments of the present invention.

FIG. 6 illustrates a combined frequency sweep of two interfering signals, in accordance with example embodiments of the present invention. FIG. 6 illustrates a first operating frequency band B1 and a second operating frequency band B2. Each band comprises multiple carriers or channels designated with f11, f12, f13, . . . for B1 and f21, f22, f23, . . . for B2. By way of example, a set of out-of-band blocking tests may be applied sequentially to each of the carriers of B1. An interferer i1 would be applied in any specific test case with a bandwidth overlapping (for example) the correspondingly tested channel. With regard to the set of test cases, i1 may sweep 602 on a test-by-test basis over the frequency range of B1, wherein, for example, i1 may be formed same for all test cases except for an offset which would be specific for each test case. Therefore an interfering signal i11 being a specific representation of i1 may be applied for testing measured carrier f11, for the next test case a specific interfering signal i12 may be formed similar to i11 except that i12 is shifted in frequency to be applied for testing measured carrier f12, etc.

When testing simultaneously bands B1 and B2, the further interfering signal i2 may follow a similar sweep pattern 602 as does i1, wherein i2 may be generated similar to i1 except for some, e.g., constant, offset. For example, a sequence of test cases may be generated wherein when the interferer i11 is applied to measured carrier f11, simultaneously the interferer i21 being a specific representation of i2 may be applied for testing measured carrier f21. When the interferer i12 is applied to measured carrier f12, simultaneously the interferer i22 may be applied for testing measured carrier f22, etc.

When generating test cases for simultaneous measurement of CA carriers in bands B1 and B2, the frequency sweep pattern of i2 may be generated from the pattern of i1, for example by applying an offset measuring the offset between bands B1 and B2. Such approach may simplify test generation.

Figure 4B:
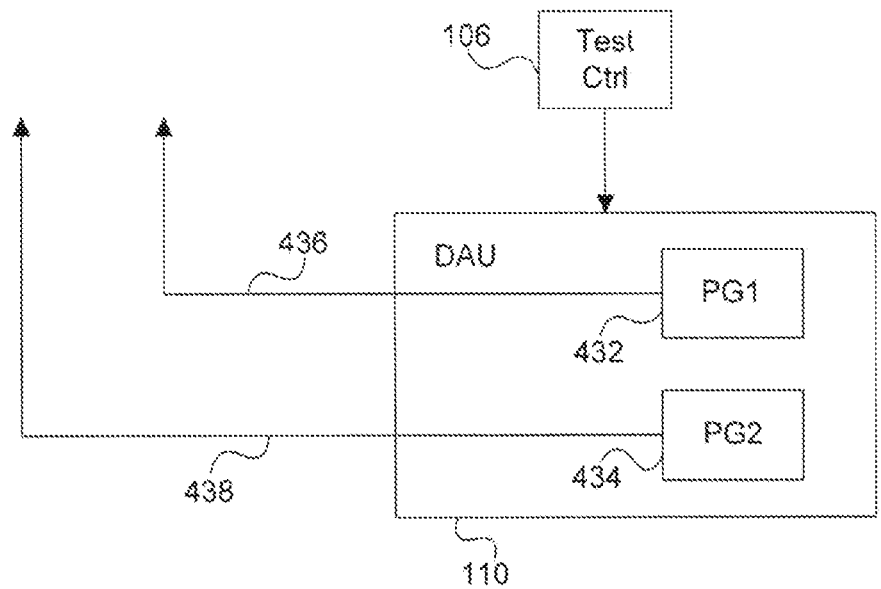
FIG. 4B illustrates a block diagram of yet further functional modules of a test system, in accordance with example embodiments of the present invention.

FIG. 4B illustrates a block diagram of yet further functional modules (e.g., the DAU 110 of FIG. 1) of a test system. In accordance with example embodiments of the present invention. DAU 110 comprises two packet generators (PG) 432 and 434. Each PG may operate to provide a stream of packets (or frames, messages) 436 and 438, respectively, wherein a stream may comprise, for example, a stream of IP (Internet Protocol) packets. One or more impairments can be imprinted onto the data streams 436 and/or 438. For example, one or more packets may exhibit a specific delay, a predefined jitter may be Imprinted on the data stream, some packet loss and/or re-ordering may be simulated on a packet sequence such as, for example, a TCP stream, one or more packets may be corrupted and/or duplicated, etc. Such impairments may enable, for example, testing an internal data handling of DUT 104.

Figure 5B:
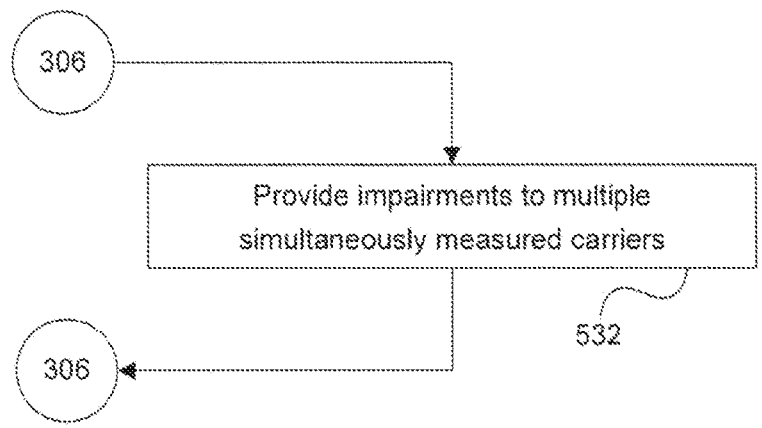
FIG. 5B is a flow diagram illustrating an operation of the test system of FIG. 4B, in accordance with example embodiments of the present invention.

While DAU module 110 is illustrated as a separate device in FIGS. 1 and 5B, according to other embodiments the functionality thereof may also be provided embedded into the RCT 106.

FIG. 5B is a flow diagram illustrating an operation of the test system 102 (e.g., with specific regard to DAU 110 of FIG. 4B), in accordance with example embodiments of the present invention. In step 532, one or more impairments are provided to each of the measured carriers 214 and 216 in FIG. 2. The DAU 110 may be adapted to simultaneously generate and provide the two data streams 436 and 438 to be transported via measured carrier 214 and carrier 216, respectively, downlink to DUT 104. The data streams 436 and 438 may be generated independently, i.e., the packet generators 432 and 434 work truly independently. According to another embodiment, only a single packet generator may be provided and one stream is copied and may be optionally buffered for some time (offset) for achieving a transmission with a delayed pattern of impairments. Generally, a pattern of impairments imprinted on each of the data streams may be the same, or may be different.

Step 532 may be performed within the course of step 306 of FIG. 3, as illustrated in FIG. 5B, i.e., during the course of measurement of DL carriers 214 and 216. Providing functionality such as discussed with regard to DAU 110, in particular regarding a capability of simultaneously providing two or more data streams with targeted impairments, enables adding further to an efficiency of testing 3DL CA and beyond as test cases for two or more measured and/or loaded carriers can be performed simultaneously in parallel.

FIG. 7A illustrates a sequence of test cases for a 3DL operating band subset, and more specifically for performing 3DL CA tests on an arbitrarily picked subset of operating frequency bands B4, B5, and B30, in accordance with example embodiments of the present invention. Complete test coverage requires measuring each of the channels of the subset covering all possible permutations. The table illustrated in FIG. 7A may result from a scheme for preparing test cases as required for testing 3DL CA configurations. For example, for measuring channel or band B4, a test case 702 has to be performed wherein the uplink is associated to B5, and a test case 704 has to be performed wherein the uplink is associated to B30. Similar test cases have to be prepared and performed for measured channels/bands B5 and B30.

Assuming the set illustrated in FIG. 7A would reflect a sequence of tests execution, the set may be reordered to group together various test cases which may be performed in parallel. For example, test cases 702 and 712 both require an active uplink in B5 which means that carriers B4 and B30 may be measured in parallel for this configuration, similar to combining test cases 156 and 160 of FIG. 1B into one test case 170 of FIG. 1C. Similarly, test cases 704 and 708 both require the uplink associated with band/channel B30, and accordingly carriers B4 and B5 may be measured in parallel for said configuration. Test cases 706 and 710 both require the uplink to be associated with band/channel B4 and accordingly carriers B5 and B30 may be measured in parallel for said configuration.

While the example test set in FIG. 7A refers to bands, the considerations likewise can be applied to each of intra-band and inter-band 3DL CA allocations and combinations thereof.

FIG. 7B illustrates a sequence of test cases for various 2DL operating band subsets corresponding to the 3DL test cases of FIG. 7A, in accordance with example embodiments of the present invention. In particular. FIG. 7B indicates those 2DL subsets which can be seen as being related to the 3DL subset of FIG. 7A due to referring also to the operating frequency bands B4, B5 and B30.

For subset B4_B5 in FIG. 7B, when an uplink is associated to a channel in band B5, the channel to be measured is in band B4 (case 732). For complete testing of the combination, all permutations have to be covered, i.e., the roles of the channels have to be swapped. Therefore, when an uplink is associated to a channel in band B4, the channel to be measured is in band B5 (case 734). Similar combinations are to be generated and executed for the 2DL subsets B4_B30 and B5_B30.

From a comparison of the tables in FIGS. 7A and 7B it turns out that each 2DL test case corresponds to a 3DL test case. For example, 2DL test case 732 comprises an UL active in B5, while measuring the CC of B4, which configuration is also tested in 3DL test case 702. 2DL test case 734 comprises an UL active in B4, while measuring the CC of B5, which configuration is also tested in 3DL test case 706, etc. The difference between test cases corresponding in this way is that the 3DL test cases have one more CC allocated or activated than the 2DL test cases. Under the assumption that the receiver performance would remain same irrespective of whether or not a $3^{rd}$ DL CC is allocated, the verification of the 2DL subsets depicted in FIG. 7B can be regarded as being redundant in view of the 3DL test configurations of FIG. 7A. Then, the test cases depicted in FIG. 7B could be skipped (omitted), i.e., excluded from the set of test cases.

Applying the discussion to the sets of FIGS. 1B and 1C, for example, the 2DL test case 154 could be skipped in view of the 3DL test case 170.

Omitting in this way a CA test case with lower number of CCs in view of a corresponding CA test case with higher number of CCs allows to even further optimize test time. With regard to the examples depicted in FIGS. 7A and 7B, according to one aspect a single 3DL CA test case including simultaneous measuring of two DL carriers can be performed and said test case replaces two 3DL CA test cases measuring each a single DL carrier only; additionally or alternatively two 2DL CA test cases can be excluded from the test suite in view of one corresponding 3DL CA test case.

The assumption of receiver performance being independent of allocated number of DL carriers may be tested by providing a corresponding (small) number of test cases. Additionally or alternatively, one, some or more of the skipped 2DL CA tests may conditionally be performed in case a corresponding 3DL CA test case has failed.

The example of FIGS. 7A and 7B has been discussed from the perspective of excluding 2DL CA tests in view of corresponding 3DL CA tests. In practical circumstances, one might prepare a test suite by first listing all required 2DL CA tests and 3DL CA tests and then scanning the list of 2DL CA tests and excluding those 2DL tests found to correspond to a listed 3DL CA test.

Another assumption which may be considered additionally or alternatively may comprise that the receiver performance would remain the same irrespective of whether or not a downlink carrier has an uplink associated thereto or not. Under that assumption a verification of various 1DL test cases can be regarded as being redundant in view of the 3DL and/or 2DL test cases of FIG. 7A and FIG. 7B, respectively. Then, 1DL test cases can be excluded, but can be provided for optional execution in case of failure of corresponding 3DL and/or 2DL test cases. Further savings in test time and test efforts can result, while keeping the test coverage at high level.

It is noted that the examples discussed here with reference to performing 3DL CA test cases and skipping 2DL and/or 1DL test cases can be generalized to performing 4DL and/or 5DL CA test cases. For example, 4DL CA test cases measuring simultaneously two or three CCs without associated UL would allow skipping one or more of corresponding 3DL, 2DL and/or 1DL test cases.

From the perspective of the primary cell or primary CC (i.e., the CC having the UL associated therewith), the above approaches may lead to a considerably reduced number of test cases available for testing different UL configurations for given DL configurations, i.e., test coverage may be less than complete in this respect, it is, however, noted that transmitter characteristics of a DUT is generally intended to be tested by a separate test suite. In order for an optimized test coverage also taking account of UL performance for given receiver characteristics, however, a pattern of uplink configuration parameters may be defined and may be implemented by distributing the pattern over the remaining test cases. Varying UL configurations can be implemented taking account of extreme parameter values, worst case assumptions, etc. for achieving optimized coverage without the entire available UL configuration being implemented.

Figure 8:
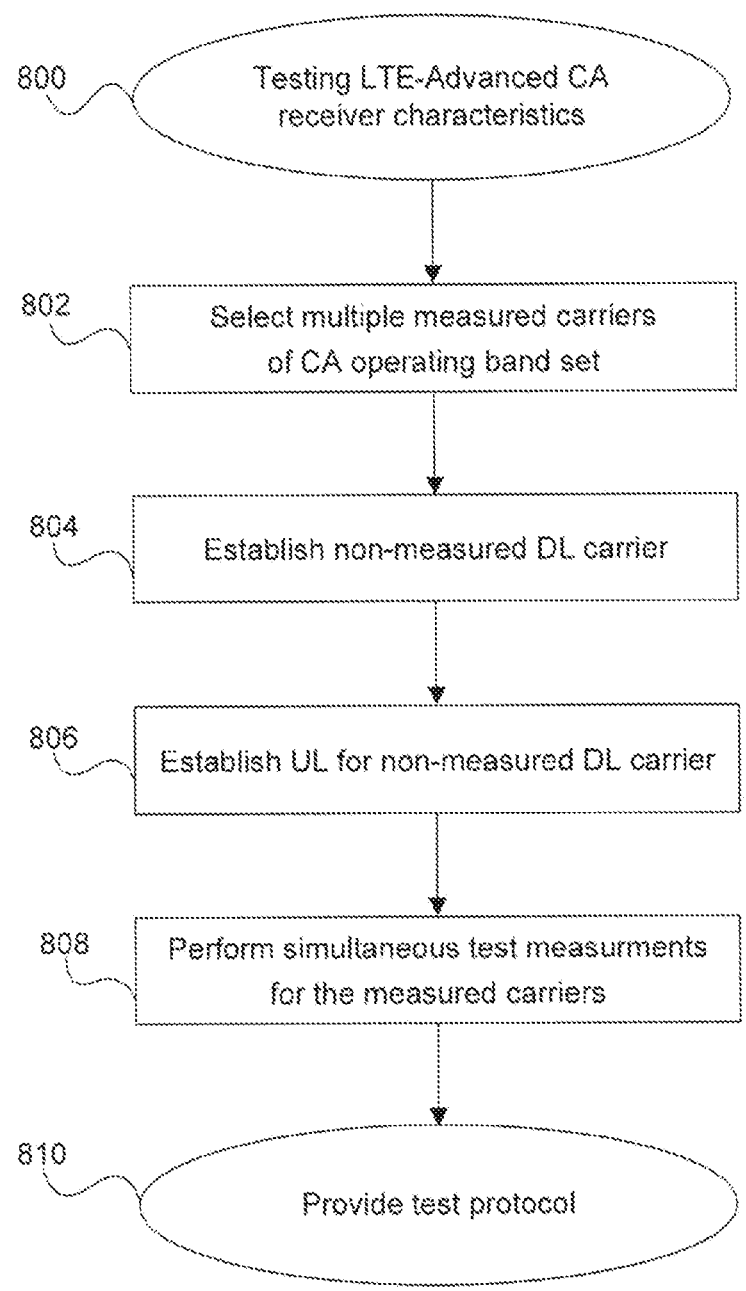
FIG. 8 is a flow diagram illustrating an alternative or additional operation of a test system, in accordance with example embodiments of the present invention.

FIG. 8 is a flow diagram Illustrating an alternative or additional operation of a test system. In accordance with example embodiments of the present invention. The operation 800 relates to testing an LTE-Advanced CA receiver characteristics. In step 802, at least two measured carriers of a CA operating band set defining at least three downlink carriers are selected. In step 804, at least one non-measured downlink carrier from the CA operating band set is established. In step 806, an uplink carrier associated with the non-measured downlink carrier is established. In step 808, test measurements for the two measured carriers are performed simultaneously. It is noted that steps 804 and 806 may be executed in any order, including parallel execution. In step 810, a test protocol is provided representing results of the performed test.

According to various embodiments discussed herein, testing of carrier allocation from 3DL CA and higher can be optimized. Test cases regarding measurement of carriers not associated with an uplink can be performed simultaneously, which may include measuring the carriers within one test case (quasi-parallel), or which may include truly simultaneously applying test conditions such as interferer signals to the two or more measured carriers.

For example, simultaneous measurements of some or all of those DL carriers not associated to an UL carrier allows optimizations in test times due to various aspects of test case set up need to be performed only once, e.g., establishing Initial conditions, establishing the various DL and UL carriers, etc. Moreover, in case of truly parallel measurements, the time for test execution is correspondingly reduced.

Various optimization options are discussed which take into account, amongst others, the available or desired test environment; for example truly simultaneous test execution may require presence of two (or more) Independent signal generators. While some optimization options may involve a trade-off in test case/test effort optimization vs. test coverage, the latter can eventually be kept at high level by, for example, declaring tests involving lower CC numbers optional which may mean that such cases need only performed in case higher CC number CA test cases have failed. In this way, the various embodiments discussed herein allow developing test suites implementing an optimum of desired test time and test coverage.

While the invention has been described in relation to its preferred embodiments, it is to be understood that this description is intended non-limiting and for illustrative purposes only. In particular, various combinations of features wherein the features have been described separately hereinbefore are apparent as advantageous or appropriate to the skilled artisan. Accordingly, it is intended that the invention be limited only by the scope of the claims appended hereto.

What is claimed is:

1. A method for testing LTE-Advanced Carrier Aggregation (CA) receiver characteristics, comprising:
  establishing, from a set of downlink (DL) carriers, a one non-measured DL carrier as a primary component carrier;
  establishing, from the set of DL carriers, a first DL carrier and a second DL carrier as secondary component carriers; and
  simultaneously performing test measurements for the first DL carrier and the second DL carrier by simultaneously providing a first interfering signal for the first DL carrier and a second interfering signal for the second DL carrier, wherein the first and second interfering signals are simultaneously provided according to a common frequency sweep pattern; and wherein the set of DL carriers forms one of a 3DL, 4DL and 5DL CA operating band set comprising at least three downlink carriers.

2. The method according to claim 1, wherein the primary component carrier and the secondary component carriers are each established according to one of intra-band contiguous CA, intra-band non-contiguous CA, and inter-band CA.

3. The method according to claim 1, wherein the test measurements are implemented for at least one of conformance tests, in-band blocking tests, out-of-band blocking tests, adjacent channel sensitivity tests, narrow band blocking tests, spurious response tests and reference sensitivity level tests.

4. The method according to claim 1, wherein the simultaneous performance of the test measurements comprises providing one or more impairments to each of the first and second DL carriers, wherein the impairment(s) comprise one or more of delay, jitter, loss, corruption, duplication and re-ordering.

5. The method according to claim 1, further comprising:
performing a set of test cases for the first and second DL carriers, wherein the set of test cases excludes at least one test case for at least one 2DL CA operating band set as being redundant in view of at least one test case for at least one 3DL, 4DL or 5DL CA operating band set.

6. The method according to claim 1, further comprising:
performing a set of test cases for the first and second DL carriers, wherein the set of test cases excludes at least one test case for at least one 1DL operating band as being redundant in view of at least one test case for at least one 3DL, 4DL or 5DL CA operating band set.

7. A non-transitory computer-readable storage medium, storing executable instructions for performing testing of LTE-Advanced Carrier Aggregation (CA) receiver characteristics, wherein the executable instructions are configured, upon execution by one or more processors, to cause an apparatus to perform the method of claim 1.

8. A method for testing LTE-Advanced Carrier Aggregation (CA) receiver characteristics, comprising:
establishing, from a set of downlink (DL) carriers, a one non-measured DL carrier as a primary component carrier;
establishing, from the set of DL carriers, a first DL carrier and a second DL carrier as secondary component carriers; and
simultaneously performing test measurements for the first DL carrier and the second DL carrier; and
performing a set of test cases for the first and second DL carriers, wherein the set of test cases excludes at least one specific combination of uplink configuration parameters from a predefined pattern of uplink configuration parameters for the primary component carrier; and wherein the set of DL carriers forms one of a 3DL, 4DL and 5DL CA operating band set comprising at least three downlink carriers.

9. A method for testing LTE-Advanced Carrier Aggregation (CA) receiver characteristics, comprising:
selecting two or more downlink (DL) carriers of a CA operating band set defining at least three DL carriers, including a first DL carrier and a second DL carrier;
establishing at least one non-measured DL carrier from the CA operating band set;
establishing an uplink (UL) carrier associated with the non-measured DL carrier; and
simultaneously performing test measurements for the selected two or more DL carriers by simultaneously providing a first interfering signal for the first DL carrier and a second interfering signal for the second DL carrier, wherein the first and second interfering signals are simultaneously provided according to a common frequency sweep pattern.

10. A test system for testing LTE-Advanced Carrier Aggregation CA receiver characteristics, comprising:
a primary component control processor configured to establish, from a set of downlink (DL) carriers, a one non-measured DL carrier as a primary component carrier;
a secondary component control processor configured to establish, from the set of DL carriers, a first DL carrier and a second DL carrier as secondary component carriers; and
a measurement processor configured to simultaneously perform test measurements for the first DL carrier and the second DL carrier; and
a first signal generator and a second signal generator, wherein the first and second signal generators are configured to simultaneously provide, respectively, a first interfering signal for the first DL carrier and a second interfering signal for the second DL carrier, and wherein the first signal generator and the second signal generator is each configured to respectively provide the first interfering signal and the second interfering signal according to a common frequency sweep pattern; and
wherein the set of DL carriers forms one of a 3DL, 4DL and 5DL CA operating band set comprising at least three downlink carriers.

11. The test system according to claim 10, wherein each of the primary and secondary component control processors is configured to establish, respectively, the primary component carrier and secondary component carriers according to one of intra-band contiguous CA, intra-band non-contiguous CA, and inter-band CA.

12. The test system according to claim 10, further comprising:
a signal impairment generator configured to provide one or more impairments to each of the first and second DL carriers, wherein the impairments comprising one or more of delay, jitter, loss, corruption, duplication and re-ordering.

* * * * *